Nov. 3, 1970 M. PADER ET AL 3,538,230
ORAL COMPOSITIONS CONTAINING SILICA XEROGELS
AS CLEANING AND POLISHING AGENTS
Filed March 28, 1969 2 Sheets-Sheet 1

INVENTOR.
MORTON PADER AND
WILFRIED WIESNER
BY
THEIR ATTORNEY

*INVENTOR.*
MORTON PADER AND
WILFRIED WIESNER
BY
THEIR ATTORNEY

United States Patent Office 3,538,230
Patented Nov. 3, 1970

3,538,230
ORAL COMPOSITIONS CONTAINING SILICA XEROGELS AS CLEANING AND POLISHING AGENTS
Morton Pader, Englewood, and Wilfried Wiesner, West Paterson, N.J., assignors to Lever Brothers Company, New York, N.Y., a corporation of Maine
Continuation-in-part of application Ser. No. 598,908, Dec. 5, 1966. This application Mar. 28, 1969, Ser. No. 811,345
Int. Cl. A61r 7/16
U.S. Cl. 424—50      10 Claims

ABSTRACT OF THE DISCLOSURE

A dentifrice composition containing as the essential polishing and cleansing ingredient a synthetic, amorphous, porous silica xerogel having an average particle diameter in the range from about 2 to about 20 microns, and preferably in the range from about 3 to about 15 microns in a cosmetically acceptable amount sufficient to give the dentifrice a dentin abrasion value of at least about 15 units.

---

This application is a continuation-in-part of application Ser. No. 598,908, filed Dec. 5, 1966, now abandoned.

The present invention relates to oral compositions, and especially to translucent and transparent dentifrices containing as the essential polishing and cleansing ingredient a particulate, highly pure, synthetic, amorphous, porous silica xerogel.

The essential object of a dentifrice is to clean the human dentition when used in conjunction with a toothbrush. This involves removal of dental plaque, materia alba, oral debris, stain, etc. It is generally recognized that a dentifrice, to be effective, must contain a solid cleaning and polishing agent. This agent should have certain characteristics, the prime two being high cleansing ability and safety for use in the oral cavity. Cleansing ability depends on the interrelated factors of hardness, particle size, shape and structure. Safety requires that these be such that the abrasive can penetrate and remove stain and debris from on and around the tooth without scratching or otherwise harming the enamel surface of the tooth, the tooth dentin, or the adjacent soft tissues under normal conditions of toothbrushing. Other important parameters to be considered in choosing solid cleaning and polishing agents for dentifrices are compatibility with common dentifrice ingredients, such as humectant, foaming agent, etc. and compatibility with therapeutic agents which might be incorporated into the dentifrice, e.g., germicides, fluorides, etc. A still further common requirement is cosmetic acceptability; the abrasive must not impart either visual or organoleptic properties which detract from cosmetic acceptability. For example, the particle size must not be so large as to make the dentifrice feel unduly gritty in the mouth.

Heretofore, the literature has disclosed the use of different natural and synthetic silicas as abrasives and polishing agents in various compositions, including toothpaste. either alone or together with other polishing agents (see e.g., German Pat. No. 974,958; French Pat. No. 1,130,627; British Pat. No. 995,351; Swiss Pat. No. 280,671 and U.S. Pat. No. 3,250,680). Among such silicas, the natural materials having crystalline structure, e.g., quartz, tend to be unduly abrasive due to the hardness and the sharpness of the particles, thus inherently scratching or excessively abrading away tooth enamel when used in dentifrice applications. Other natural silicas, e.g., diatomaceous earth and glasses, having an amorphous structure, are difficult to obtain commercially in uniform size and tend to be excessively impure for cosmetic or dentifrice use. Further, some of the amorphous natural silicas also tend to be highly abrasive and thus unsuitable for dentifrice use.

The synthetic amorphous silicas suggested by the prior art, such as precipitated silicas, pyrogenic silicas, and aerogels, are also undesirable for dentifrice use either because of their initial small particle sizes or because of the ease in which they break down into small particle sizes resulting in poor cleaning ability. Thus pyrogenic silicas, e.g., the product marketed under the trademark, Cabosil, show substantially no cleaning ability on human teeth when incorporated in a dentifrice paste base.

The synthetic and natural crystalline silicas, which are also suggested in the prior art, are too hard to be safely used in a dentifrice as the major abrasive component.

Considering that the intrinsic hardness (Mohs hardness) of silica particles ranges between about 7 for crystalline material and about 5 for amorphous material, as compared to the softer tooth enamel and dentin, having values of about 4–5 and 2–2.5, respectively, it is not surprising that the use of silicas as cleaning and polishing agents in dentifrices has not heretofore become widespread.

Various proposals have been made heretofore, e.g., in U.S. Pats. Nos. 2,820,000 and 2,975,102, Spanish Pat. No. 326,564 and Belgian Pat. No. 586,645, for formulating paste dentifrices that have a certain degree of translucency or transparency. In one such proposal a clear, jelly-like transparent dentifrice comprises, as a swelling agent, a mixture of water-soluble acrylic resins. This dentifrice, however, is free of any solid materials, such as particulate cleaning or polishing agents. In view of the absence of such solid particulate materials, the degree of cleansing is inadequate.

We have now discovered that certain specific silicas, not heretofore recognized as having utility in the dentifrice art, can be incorporated in dentifrices, especially tooth paste, to yield compositions which when applied topically to the teeth in toothbrushing result in surprisingly good cleaning and polishing of the teeth and produce a high luster without excessive enamel or dentin abrasion. In addition, these silicas are highly compatible with most common dentifrice ingredients, including oral health agents, and may be formulated to produce transparent or translucent pastes.

More specifically, in accordance with the present invention there are provided dentifrice compositions containing as the essential polishing and cleansing ingredient a synthetic, amorphous, porous silica xerogel having an average particle diameter in th range from about 2 to 20 microns, and preferably in the range from about 3 to about 15 microns. This silica is present in the dentifrice compositions in a cosmetically acceptable amount sufficient to give the dentifrice a dentin abrasion value of at least about 15 units as measured by the test described hereinafter.

As used herein and in the appended claims, the expression, "a cosmetically acceptable amount" is intended to refer to that amount of polishing and cleansing ingredient which when combined with common toothpaste ingredients of a non-abrasive nature (humectant, foaming agent, binding agent, fillers, etc.) will give a smooth, flowable, not excessively gritty, acceptable tasting toothpaste. Amounts greater than the aforementioned can yield a paste which is excessively firm, even rigid, and difficult to package and extrude and use on a toothbrush. Lesser amounts than contemplated will fail to furnish the desired polishing and cleaning effect as manifest when the dentin abrasion value is below the minimum set forth herein. This cosmetically acceptable amount generally lies in the range from about 5% to about 50% by weight of the total dentifrice and the preferred range is from about 8% to about 20% by weight of the dentifrice.

Silica xerogel is intended herein to refer to synthetic, aggregated, amorphous, porous silica having an average particle diameter of between about 2 and 20 microns, preferably between about 3 and 15 microns, and generally a surface area of at least about 300, preferably about 600 to 800 square meters per gram. Unlike conventional crystalline silicas of comparable particle size, the silica xerogels of the present invention do not substantially abrade or scratch tooth enamel and have no more gritty feel than conventional dentifrice abrasives.

The differences between the silica xerogels of the present invention and other silica gels and natural occurring silicas are more fully understood by referring to the following figures in which.

Figure 1:
FIG. 1 is an electron micrograph of a silica xerogel.

Referring to FIG. 1, it can be seen that the xerogel particle structure is porous, almost sponge-like. This is most apparent around the periphery of the particle. It may also be seen that the system is quite highly developed. The elementary silica particles making up the "walls" of the structure are relatively densely packed, and, as a result, the "walls" are strong enough to make the entire structure resistant to shear. The special degree of packing of the elementary silica particles in the xerogel, in contrast to silicas with higher or lesser degrees of packing, is a function of the conditions under which the xerogel is synthesized.

While it is not completely understood why the silica xerogel particle structure possesses extremely high cleansing and polishing ability without harmfully abrading the tooth enamel surface, it is believed that the explanation is as follows:

The abrasive and polishing action of a dentifrice abrasive particle depends on the toothbrush bristles rubbing it along the surface of the tooth and accretions thereon. The extent of abrasive action depends among other factors on the pressure applied to the abrasive particle through the toothbrush. If only a minimum pressure is employed, even a very hard, sharp particle, such as quartz, would be expected to have little deleterious effect. On the other hand, if a very soft otherwise comparable particle is employed, even vigorous toothbrushing would be inadequate to remove tooth stains and other deposits. Thus, if the abrasive particles of this invention were composed of only highly aggregated, closely packed, ultimate silica units, in a non-porous structure, they would be excessively abrasive for use under normal toothbrushing conditions. It is probable, however, that when the toothbrush pressure is high, abrasive action of the xerogel particles is accompanied by crumbling of the porous xerogel structure. The resultant particles are either themselves too small to produce an appreciable amount of abrasion or so like the particles from which they are derived that they, too, undergo further disruption if they are subjected to excessive pressure. It is probable that the smaller particles, either present initially or resulting from disintegration of larger particles, in large measure, contribute to the polishing action of the xerogel.

Figure 2:
FIG. 2 is an electron micrograph of a silica aerogel.

The silica aerogel particle of FIG. 2 also exhibits a porous sponge-like structure. The "walls" of this structure are made up of the same ultimate silica particles as those of the xerogel. It may be seen, however, that the aerogel particles are less dense than the xerogel particles. It is evident from FIG. 2 that the elementary silica particles which provide the structure of the aerogel "walls" are aggregated only loosely, and thus the structure can be broken down by the application of only moderate shearing and mechanical forces. As a consequence, the aerogel is not suitable for dentifrice abrasive applications. Not only will it break down too quickly under the force exerted through a toothbrush, but it probably undergoes substantial degradation under the forces encountered in normal toothpaste mixing operations.

Figure 3:
FIGS. 3–5 are photomicrographs of naturally occurring diatomaceous silicas.
Figure 4:
Figure 5:

The various forms of naturally occurring diatomaceous silicas shown in FIGS. 3–5 (which was reproduced from a sales bulletin, S.B. No. 115, Dicalite Department, Great Lakes Carbon Corporation) are hard, non-uniform, frequently dense particles which are typical of these materials. Referring to the figures, some of the particles appear porous, however, the walls providing the structure are tightly packed and relatively thick. While these particles have cleaning ability, because of their dense structure, they are extremely abrasive. Thus, when the material is of a particle size suitable for dentifrice abrasive applications, it will scratch tooth enamel, making it totally unsuitable for use in an oral composition.

Further, as can be seen from FIGS. 3–5, the diatomaceous silica particles are of non-uniform size and excessively impure. Therefore, such material cannot be used in an oral preparation, since no uniform product can be obtained without undue, costly procedures. Uniformity, of course, is essential in marketing an oral preparation.

The silica particles essential to this invention are reproducible in size, highly pure, and compatible with numerous oral health agents.

The silica xerogels of the present invention may be prepared by the addition of a mineral acid, e.g., sulfuric acid, to a sodium silicate solution to form a silica sol. The resulting gel formed therefrom on aging is called a hydrogel. It consists of a three dimensional network of polymerized silica units. Each of these units, also referred to as ultimate particles, have an approximate size of 5–15 millimicrons. Several different types of silica gels are obtained depending, among other factors, on the conditions of drying or, generally, the type of water displacement in the initial gel. Among them are the xerogels represented by FIG. 1 and the aerogels, represented by FIG. 2. In the preparation of the xerogels within the scope of this invention, the initial hydrogel is slowly washed and dried. In a preferred embodiment, the pH during this operation is kept at about 4. During the slow washing and drying step, a strong shrinkage of the network structure occurs reducing the average pore diameter. This microporous structure is the reason for the large surface area of the xerogel. The small size of the pores also contributes to the overall rigidity of xerogel particles making them ideal abrasive particles.

Aerogel silicas, which are not within the scope of the invention, are obtained by washing the original gel and then removing the water from the initial hydrogel by means which avoid shrinkage of the gel, such as by steam micronizing process. The final product generally has a pore diameter in excess of about 10 millimicrons. The bonds between the ultimate particles are less rigid, thus facilitating a break down of the agglomerate particle into smaller submicron units. The surface area of commercially available aerogels is usually about 200–300 m.$^2$/g., as determined by the nitrogen adsorption method.

The physical properties and other methods of manufacturing silica xerogels of the invention are more fully illustrated. enamel loss. The test tooth was first conditioned by stortrated at pages 127–174 of "The Colloid Chemistry of Silica and Silicates," R. K. Iler (New York, Cornell University Press, 1955).

A suitable silica xerogel of the present invention is available from Grace, Davison Chemical Company under the trade name, Syloid 63. This material has an average particle diameter of about 8–10 microns. Other suitable silicas include Syloid 65 (average particle diameter of about 5 microns), Syloid 73 (average particle diameter of about 5 microns), and Syloid 404 (average particle diameter of about 6 microns), all of which are available from Grace, Davison Chemical Company.

In order to maintain short texture and thixotropic behavior as well as generally desirable cosmetic properties, the dentifrice compositions of the invention may contain in addition to the above described essential polishing and cleansing ingredient, a second less effective cleaning ingredient, for example, from about 0.5% to about 20%, and preferably from about 2% to about 15%, by weight of the dentifrice, of a synthetic, amorphous, porous silica aerogel or pyrogenic silica which polish but do not clean satisfactorily when used alone and which have thickening and gelling properties.

Since the terms cleaning and polishing are words of art, it should be understood that as used herein, cleaning refers to the removal of food debris, dental plaque, calculus, tooth surface stains, etc., whereas polishing refers to the creation of a high luster on the tooth surface without necessarily being able to clean said surface. A more comprehensive definition of cleaning and polishing can be found in chapter 15 of "Cosmetics Science and Technology" published by Interscience, Inc., second printing, 1963.

The particulate synthetic silicas which may be used as optional ingredients in the present invention are characterized by an average particle diameter generally below about 4 microns. Typical examples thereof include Cabosil (pyrogenic silica) and Syloid 244 (aerogel) having an average particle diameter of about 0.02 and 3 microns, respectively.

The difference between silica gels operable in the present invention and the multitude of silica gels available which are inoperable can be further seen by reference to the details of manufacture. As was explained above, the silica xerogel and silica aerogel are prepared from a silica hydrosol. The silica hydrosol is made under specific conditions by the addition of weak alkali metal silicate to dilute acid solution. The hydrosol is relatively structureless and care must be exerted in its preparation, for example, not to form a precipitate. The hydrosol is allowed to set into a gel which is then termed a hydrogel. The properties of the hydrogel depend on many factors among which are time of aging, water content, pH and temperature. Basically, the hydrogen is a hydrated amorphous silica gel. The method of dehydrating the hydrogel is another critical feature which will determine the characteristics of the ultimate product. Thus if water is removed suddenly at high temperatures, a weak structure with high pore volume is formed which has inadequate strength for it to suffice as the sole abrasive agent in a tooth paste. An example of such a structure is the silica aerogel shown in FIG. 2 of the drawings, which is a loose, honeycomb-like structure. However, if the water is removed by relatively slow evaporation as by hot air drying, a product such as shown in FIG. 1 of the drawing can be obtained. It is during this slow dehydration that the silica hydrogen structure shrinks (essentially irreversibly) and the silica structure becomes increasingly dense and pore diameters are decreased. The particle formed by the aforesaid method will resist such physical forces as abrasion against a tooth surface, and is thus an effective abrasive when employed in a dentifrice. It also resists hydration and thereby retains structural strength and abrasiveness even though exposed to water and/or humectants in tooth paste formulations for a period of a year or more.

The pyrogenic silicas, which are in many ways similar to aerogel and not within the scope of the present invention, are prepared by vapor phase hydrolysis of silicon tetrachloride in a hot gaseous environment such as about 1100° C. The particles of these materials are so small that they are essentially structureless and, therefore, cannot clean a tooth surface when used in a dentifrice composition.

The following Table I demonstrates the ineffectiveness of the silica aerogel as a cleaning agent in dentifrice compositions as compared to the silica xerogels which are within the scope of the present invention.

TABLE I.—TABULATION OF PERFORMANCE DATA OF SILICA MATERIALS IN A DENTIFRICE FORMULATION

| Concentration of Major components | Enamel abrasion, μ | Dentin abrasion, units | Zein abrasion | Luster | Translucency index |
|---|---|---|---|---|---|
| 15% silica aerogel I | 3 | 5.1 | None | 54 | 0.92 |
| 20% silica xerogel II | 3 | 11.8 | Very slight | 57 | 0.92 |
| 20% silica xerogel III | 2 | 18.4 | Moderate | 58 | 0.89 |
| 20% silica xerogel IV | 3 | 23.5 | ___do___ | 59 | 0.92 |
| 5% silica xerogel V, 15% silica xerogel III | 5 | 56.3 | Substantial | 57 | 0.92 |
| 10% silica xerogel VI, 10% silica xerogel III | 4 | 81.9 | ___do___ | 58 | 0.85 |
| 14% silica xerogel VI, 7.5% silica aerogel I | 7 | 82.2 | Moderate/substantial | 56 | 0.88 |
| 14% silica xerogel V, 7.5% silica aerogel I | 6 | 126.7 | Substantial | 51 | 0.94 |
| 25% silica xerogel VI | 6 | 136.5 | Very substantial | 54 | 0.84 |
| 25% silica xerogel V | 7 | 155.4 | ___do___ | 52 | 0.89 |

Referring to Table I, the major components, i.e., silica xerogel, silica aerogel and combinations thereof were mixed in a dentifrice composition in the stated concentrations. The dentifrice composition used contained the following materials in amounts designed to provide a cosmetically acceptable tooth paste: carboxymethylcellulose, sorbitol (70% aqueous solution), sodium benzoate as a preservative, saccharin as a sweetener, a colorant, sodium laurylsulfate, glycerin, and a flavor. The physical properties of the silicas used in Table I are shown in the following Table II.

TABLE II.—TYPICAL PHYSICAL PROPERTIES OF THE SILICA MATERIALS OF TABLE I

| | Silica aerogel I | Silica xerogel II | Silica xerogel III | Silica xerogel IV | Silica xerogel V | Silica xerogel VI |
|---|---|---|---|---|---|---|
| Loss on ignition (percent) | 6.5 | 3.0 | 2.0 | 0.6 | 6.00 | 6.00 |
| Particle size (diameter in microns) | 3.2 | 5.3 | 6.3 | 5.0 | 8.6 | 4.4 |
| Color (hunter reflectometer) | 93 | 94 | 94 | 94 | 92 | 92 |
| Surface area (square meters per gram) | 300 | 370 | 340 | 330 | 700 | 700 |
| Oil adsorption lb./100 lbs | 300 | 170 | 170 | 225 | 90 | 90 |
| pH (5% slurry in $H_2O$) | 7–8 | 7.2 | 7.0 | 7.0 | 3.8 | 3.8 |

The particle size distribution of the silica materials listed in Tables I and II are shown in the following Table III. For purposes of convenience, the average weight median diameters of the particles for each of the silica materials are also shown.

TABLE III.—PARTICLE SIZES OF SILICA MATERIALS* CUMULATIVE WEIGHT, PERCENT—OVERSIZE

| | Silica aerogel I | Silica xerogel II | Silica xerogel III | Silica xerogel IV | Silica xerogel V | Silica xerogel VI |
|---|---|---|---|---|---|---|
| Micron size: | | | | | | |
| 25 | 0 | 0 | 3.4 | 0 | 3.5 | 1.0 |
| 19 | 0 | 0 | 6.4 | 0 | 13.4 | 1.0 |
| 17 | 0 | 0 | 6.4 | 0 | 17.7 | 1.3 |
| 15 | 0 | 5.3 | 8.8 | 0.3 | 26.5 | 1.5 |
| 13 | 0 | 11.3 | 12.3 | 0.9 | 33.3 | 1.5 |
| 11 | 0.15 | 23.4 | 20.0 | 2.4 | 41.3 | 1.5 |
| 9 | 0.3 | 24.0 | 31.7 | 8.4 | 49.1 | 1.6 |
| 7 | 0.6 | 25.8 | 45.0 | 22.8 | 57.1 | 2.3 |
| 5 | 8.4 | 55.9 | 64.1 | 47.5 | 68.5 | 30.8 |
| 3 | 56.1 | 87.6 | 86.8 | 85.1 | 85.8 | 80.0 |
| 1.6 | 78.1 | 93.8 | 93.4 | 92.6 | 92.9 | 90.0 |
| Weight median diameter | 3.2µ | 5.3µ | 6.3µ | 5.0µ | 8.6µ | 4.4µ |

* Values from Model B Coulter Counter, dual threshold technique.

The effectiveness of the cleaning ability of the various silica materials is shown in Table I under the columns entitled "Dentin" and "Zein" abrasion. The test procedures will be discussed in connection with the examples.

It will be noted that when the silica aerogel and Xerogel II were below the accepted dentin abrasion units, which must be at least 15 for it to be acceptable as a cleaning agent, very little cleaning was achieved. More specifically, the zein abrasion test shows no, or very slight, cleaning for the silica aerogel and Xerogel II, whereas when the other silica xerogels were used, the zein abrasion was moderate to very substantial. This table clearly demonstrates that only the specific silica xerogels, contemplated by the present invention, are useful as cleaning agents in an oral composition. Further, it will be noted under the heading entitled "Enamel Abrasion," there was only nominal loss of enamel when the silica xerogels of the invention were used despite the hardness of these materials. This was totally unexpected, since as brought out above, when natural occurring silicas, such as diatomaceous earth are used, the loss of enamel is exceptionally high because of the hardness of these materials.

The polishing effects of the aerogel and xerogel which are found under the heading "Luster and Translucency Index," are almost the same. Thus, the silica xerogel can be used alone as a cleaning and polishing agent or, if desired, in combination with another polishing agent such as the silica aerogel or pyrogenic silica.

Also, small amounts up to about 10% by weight of the dentifrice of conventional dental cleansing ingredients, such as water-insoluble sodium metaphosphate, can be included, if a high degree of translucency is not required. Such ingredients can have both cleansing and polishing properties.

The amounts of silica xerogels of the present invention which can be used in an oral composition depends on the amount necessary for cleaning without excessive abrasion of the tooth surface and cosmetic acceptability. Cosmetic acceptability, as explained above, refers to a dentifrice with acceptable flow properties, easy dispersibility in the mouth and resistance to drying out. It has been found that because the silica xerogels of the present invention tend to cause less thickening of the dentifrice humectant systems than when such systems incorporated aerogel or pyrogenic silicas, larger amounts of xerogel can be incorporated into such systems.

The dentifrice of the invention can also contain as optional ingredients a soap or synthetic detergent as a surface tension depressant; flavoring materials; buffers; sweeteners, such as saccharin; humectants; preservatives; and harmless coloring materials, in proportions to give any desired effect. These are conventional components of dentifrices, and materials suitable for this purpose need not be enumerated, for they are well known to those skilled in the dentifrice art.

In a preferred embodiment of the invention, the dentifrice is in the form of a paste, and in this event it will contain humectant materials and a binder in amounts to give the dentifrice a smooth texture and good flowability. Glycerin and sorbitol are preferred carriers and softeners, but ethyl alcohol, mineral oil, corn syrup, glucose and invert sugars, glycols and honey can also be employed. As binders there can be used gum tragacanth, sodium carboxymethylcellulose, hydroxyethylcellulose, Indian gum, Irish moss or carragheen and its derivatives, starch, acacia gums, agar agar, locust bean gum, pectin and petrolatum. Those skilled in the dentifrice art know other carriers and softeners, and binders.

The degree of translucency of the product of this invention can be increased or decreased by varying the amount and composition of the humectant materials. For example, certain flavoring materials could be more soluble in one humectant system than in another. Obviously, insoluble flavoring materials will decrease translucency, and appropriate changes in the humectant system to enhance solubility would simultaneously enhance translucency. Additionally, it has been found that greater translucency is obtained when the refractive index of the humectant system is adjusted appropriately. Thus, a system containing appropriate amounts of glycerin, sorbitol and/or water can give a transparent product. The effect can be attributed to a closer matching of the refractive indexes of the solid and liquid portions of the dentifrice. An unusual feature of the compositions of the present invention, is that a high degree of translucency can be obtained even when the refractive indices are not matched exactly.

The use of the silica polishing and cleansing ingredient in the dentifrice compositions of the invention permits the incorporation therein of oral health agents, such as germicides, antibiotics, astringents or fluorine-containing compounds. Typical examples thereof include tyrothrycin, chlorophyllins, hexachlorophene, the sarcosides, astringent salts and water-soluble ionizable fluorine-containing compounds, such as sodium fluoride, lithium fluoride, stannous fluoride, potassium fluoride, ammonium fluoride, sodium fluostannite, stannous chlorofluoride, sodium monofluophosphate, and the like.

Such oral health agents are employed in a beneficial amount normally ranging from about 0.01% to about 2% by weight of paste dentifrice. The humectants are generally employed in an amount from about 5% to about 75% by weight of the dentifrice, the binders in an amount from about 0.5% to about 30% by weight of the dentifrice, flavoring agents in an amount from about 0.1% to about 5% by weight of the dentifrice, water in an amount from about 4% to about 60% by weight of the dentifrice, surface tension depressants in an amount from about 0.01% to about 6% by weight of the dentifrice, buffers in an amount from about 0.02% to about 10% by weight of the dentifrice and preservatives in an amount from about 0.01% to about 2% by weight of the dentifrice.

The detifrices are prepared by blending the components thereof together with deaeration being necessary for the translucent and transparent toothpastes.

In the examples illustrating the dentifrice compositions of the invention set forth below, the following test procedures were employed.

ENAMEL ABRASION TEST

Abrasion (enamel loss) was assessed by measuring the thickness of extracted human teeth before and after each brushing with a given dentifrice; any difference represented enamel loss. The test tooth was first conditioned by storage in tap water until the thickness measurements were constant and remained constant for three successive days. The tooth was mounted in the bottom of a metal cup directly below a revolving brush of the type used by dentists in prophylactic work. The slurry of the test product was then poured into the cup and the machine was operated. The cup and tooth were moved slowly back and forth beneath the revolving brush for a period of one hour. The tooth thickness was then remeasured. The abrasion loss represents the difference between the initial and final measurements of tooth thickness. Results on three teeth were averaged to obtain the abrasion loss value. The desirable region of enamel abrasion in this test is considered to be from about 1 to about 10 microns. Most existing tooth pastes produce an abrasion of about 1 to about 10 microns.

Surface effects evaluation to determine the presence and extent of pits, scratches and grooves was done by microscopic examination at a magnification of 57× of teeth brushed with the dentifrice, whose surface had first been made pit and scratch free by polishing with a suitable abrasive.

LUSTER TEST

The standardized luster test to evaluate ability to improve tooth luster was carried out as follows:

The labial surface of an extracted human central incisor was smoothed with sandpaper, ending with fine grade sandpaper, followed by levigated alumina, and then dulled by buffing with a slurry of chalk. The enamel surface then contained pits characteristic of a chalk-dulled surface. The degree of dullness was carried to a uniform low reflectance level as measured by a standardized light source-photocell assembly. The tooth was then brushed with the test composition on a standardized brushing machine for a period of two hours, after which the luster was again measured. The luster increase represents the difference between the prebrushing luster figure and the figure obtained after brushing with the test dentifrice, and is the average of the luster increase obtained on three different teeth. The measurement of luster of any one tooth is accurate within one unit.

ZEIN ABRASION TEST

The cleansing ability of the dentifrices was evaluated in vitro using the following technique.

A modified, blue-tinted, zein film was applied to a copper alloy surface. This surface was then brushed for 6 minutes with a slurry containing 1 part dentifrice and 2 parts water using the reciprocating brushing action of a standard brushing machine yielding 150 double strokes per minute. The brushing head was equipped with flat bristle heads of medium nylon brushes. A weight of 230 grams was placed in top of the brushing head.

COMPOSITION AND PREPARATION OF ZEIN SOLUTION

| Ingredients: | Parts by weight |
| --- | --- |
| Zein | 100. |
| Tripropylene glycol | 90 Group A. |
| Isopropyl alcohol (91%) | 488 Group A. |
| Formaldehyde (37%) | 30 Group A. |
| Ammonium thiocyanate | 4. |
| Water | 100 Group B. |
| Ammonia (28%) | 30 Group B. |
| FDC Blue No. 1 | 1 Group B. |

The zein was added gradually to the Group A ingredients. The system was agitated vigorously until all of the zein was completely dissolved. The ammonium thiocyanate, a catalyst for the polymerization of formaldehyde with zein, was added and the solution was allowed to cure for 2½ hours with constant agitation. At the end of this time, the cure was inhibited by addition of Group B ingredients. Agitation was continued for an additional 30 minutes. All operations were conducted at room temperature.

PREPARATION OF THE COATED COPPER ALLOY STRIPS

Copper alloy strips having the dimensions 2¹⁵⁄₁₆" × ¾" × ¹⁄₁₆" were thoroughly cleaned with Emery cloth, grade 2, followed by Emery cloth, grade 2/0, rinsed with water and dried. Zein solution was applied by immersing the strips in the zein preparation and drip-drying at room temperature in a vertical position (with respect to the length of the strips) for about 2 to 6 minutes. During the period of drip-drying excess solution was removed from the back and the edges of the strips. The coating was then baked for 2 hours at 105° C. to 120° C. in a horizontal position. After cooling to room temperature, the samples were ready for use.

The evaluation of the degree of abrasion of the zein film is only semi-quantitative, i.e., the strips were compared visually to a standard strip brushed with a slurry of 1 part regular Pepsodent tooth paste to 2 parts water and a second strip brushed with water. Pepsodent is a conventional commercial dicalcium phosphate dihydrate tooth paste containing on the order of about 50% of this ingredient. Each slurry was run three times. While water brushing did not remove any discernible amount of film, brushing with Pepsodent tooth paste removed a substantial amount.

During the testing of all dentifrices, a Pepsodent tooth paste standard and a water standard were run simultaneously in order to allow for variations in resistance of zein films.

GERMICIDAL ACTIVITY TEST

Germicidal activity for those dentifrices containing a germicide was determined by the buccal tissue count test (BTC-test) which was conducted in the following manner.

Buccal epithelial scrapings were obtained from a subject's mouth by means of a curette. This was done by scraping the inside of either cheek with several strokes until the cup-like receiver of the curette was filled with a mixture of mucus-epithelial detritus. The tissue was transferred from the curette by agitation into 10 ml. sterile 0.1% peptone water contained in a screw-capped test tube. The contents were shaked thoroughly, diluted so as to result in "countable" plates (30–300 colonies), and 1 ml. aliquots in duplicate plated directly into Blood Agar Base (Difco). Counts were made after 48 hours incubation at 37° C. The antiseptic action of dentifrices on oral flora was evaluated by running BTC's before and 3 hours after use of the dentifrices. The reduction is expressed in percent.

TRANSLUCENCY TEST

The translucency of the dentifrice was determined in the following manner.

Translucency values were derived from differences in reflectance with alternate use of white and black surfaces behind a 1.6 mm. cell in a General Electric Spectrophotometer with integrating sphere optics.

An arbitrary translucency index, TI, was defined as being equal to 1−AR where AR equals.

$$\left[\frac{\text{Absorbency with white backing}}{\text{Absorbency with black backing}}\right]$$

measured at a wavelength of 540 mμ for dentifrices with blue colorant and 660 mμ for dentifrices with red colorant.

The TI increases with increasing translucency. Dentifrices having a TI of 0 to about 0.5 are classified as being opaque for the purpose of this invention. Dentifrices having a TI of greater than about 0.5 are classified herein as translucent while dentifrices having a TI of greater than about 0.8 are classified herein as transparent.

A currently marketed dicalcium phosphate dihydrate tooth paste, e.g., has a TI of 0.12.

FLUORIDE AVAILABILITY TEST

Fluoride availability for these dentifrices containing a fluoride was measured by the following test procedure.

A 10 g. sample of dentifrice is dispersed in 100 ml. of distilled water. The slurry is then centrifuged at 2800 to 3000 r.p.m. for one hour. The fluoride is then determined in a sample of the clear supernatant. The amount of water-extractable fluoride found in the supernatant is expressed in percent of the total fluoride present in the dentifrice sample.

DENTIN ABRASION TEST (A) Preconditioning to remove surface debris: The radioactive (about one millicurie by exposing the teeth for 5 hours to a neutron flux of $10^{12}$ neutrons/cm.$^2$, the temperature during irradiation not exceeding 40° C.) specimens of dentin are transferred to the perspex troughs of the standard brushing machine, which was described in connection with the cleaning test and their surfaces cleaned of debris, etc. by brushing for 2,000 double brush strokes in a slurry of waterworks chalk tooth paste (20 g. tooth paste +70 g. of water).

(B) "Conditioning" the dentin surfaces: Prior to a test run for any particular tooth paste, the specimen surface must be "conditioned" using a slurry of that tooth paste (20 g. tooth paste +70 g. water). The number of double brush strokes is 1,000 for dentin. The slurry is poured into a graduated cylinder and the volume of slurry observed.

Since a constant weight of tooth paste is added to the trough, it may be necessary to make a small correction for the different volumes of tooth paste slurries used. This correction can be determined from the total measured volumes of slurry as described above.

(C) Test run: After pouring away the "conditioning" slurry as detailed in Section B above, the troughs are washed thoroughly in distilled water. A slurry of the same tooth paste is then added to the troughs (20 g. tooth paste +10 gm. water). After ensuring the specimen is adequately covered, it is brushed for 500 strokes. At the end of this run 15 ml. of distilled water are added to the trough, mixed thoroughly with a glass rod, and a further 500 double brush strokes given. This procedure is repeated for a further three additions of 15 ml. of distilled water. At the completion of the test, the dentin will have been brushed for 2,500 double brush strokes.

The active slurry is poured from the trough and any excess foam destroyed with a few drops of ether. After stirring, two 1 ml. samples of the slurry are withdrawn with a pipette, and transferred to aluminum planchets 2.5 cm. diameter. The slurries are dried under an infra-red lamp for one hour.

(D) Order for testing pastes: The order for testing a series of tooth pastes is to start and finish with the waterworks chalk reference. This insures that the wear rate (with respect to the reference) has not altered from the beginning and end of the whole run. Should there be large differences between the two values for the reference, the results should be discarded and a new set of irradiated specimens used to repeat the series.

(E) Radiotracer counting: The radioactivity of the slurry samples is determined with a Geiger microcounter. To avoid having to make corrections for decay in activity, the counts for all the samples are made within a short period of time. All counts for activity must be corrected for "dead time" and background errors.

(F) Calculation of results: The dentin abrasion value for a particular tooth paste will be the ratio of the corrected counts for that paste to the average count for the reference.

For convenience the reference chalk paste (40% by weight of a coarse chalk) is given a dentin abrasion value of 100.00 units.

EXAMPLE 1

| Ingredients: | Percent |
|---|---|
| Silica Xerogel V | 12.00 |
| Silica Aerogel I | 5.00 |
| Hydroxyethylcellulose | 1.50 |
| Saccharin | 0.20 |
| Glycerin | 34.76 |
| Water | 39.00 |
| Stannous fluoride | 0.41 |
| FDC Blue No. 1 (1%) | 0.03 |
| Flavor | 1.10 |
| 21% sodium lauryl sulfate–79% glycerin mixture | 6.00 |
| Total | 100.00 |

Luster increase—60
Enamel abrasion—3 microns
Surface effects—Acceptable
Cleansing—Same as a commercial dentifrice (Pepsodent)
Available fluoride—70%
Translucency index—0.66
Dentin abrasion—Greater than about 15 units

EXAMPLE 2

| Ingredients: | Percent |
|---|---|
| Silica Xerogel V | 15.00 |
| Silica Aerogel I | 8.00 |
| Sodium carragheenate | 1.30 |
| Saccharin | 0.20 |
| Glycerin | 31.53 |
| Water | 32.54 |
| Polyethylene glycol (average molecular weight 400) | 4.00 |
| FDC Blue No. 1 (1% solution) | 0.02 |
| Hexachloorphene | 0.05 |
| Tribromosalicylanilide | 0.05 |
| 21% sodium lauryl sulfate–79% glycerin mixture | 6.00 |
| Stannous fluoride | 0.41 |
| Flavor | 0.90 |
| Total | 100.00 |

Luster increase—60
Enamel abrasion—5 microns
Surface effects—Acceptable
Cleansing—Same as product of Example 1
Available fluoride—74%
Translucency index—0.60
Germicidal activity—79.2%
Dentin abrasion—Greater than about 15 units

EXAMPLE 3

| Ingredients: | Percent |
|---|---|
| Silica Xerogel V | 14.00 |
| Silica Aerogel I | 7.50 |
| Sodium carboxymethyl cellulose | 0.90 |
| Saccharin | 0.20 |
| Glycerin | 35.00 |
| Water | 32.23 |
| Colorant (1% solution) | 0.07 |
| Flavor | 1.10 |
| Chloroform | 1.75 |
| 21% sodium lauryl sulfate–79% glycerin mixture | 7.00 |
| Sodium hydroxide (30%) | 0.15 |
| Tribromosalicylanilide | 0.10 |
| Total | 100.00 |

Luster increase—56
Enamel abrasion—3 microns
Surface effects—Acceptable
Cleansing—Same as product of Example 1
Translucency index—0.54
Dentin abrasion—Greater than about 15 units

EXAMPLE 4

Ingredients: Percent
- Insoluble sodium metaphosphate — 6.00
- Silica Xerogel V — 12.00
- Silica Aerogel I — 5.00
- Sodium carragheenate — 1.30
- Saccharin — 0.20
- Glycerin — 31.53
- Water — 32.95
- Polyethylene glycol (average molecular weight 400) — 4.00
- Colorant (1% solution) — 0.02
- Flavor — 0.90
- Hexachlorophene — 0.05
- Tribromosalicylanilide — 0.05
- 21% sodium lauryl sulfate–79% glycerin mixture — 6.00

Total — 100.00

Luster increase—61
Enamel abrasion—5 microns
Surface effects—Acceptable
Cleansing—Same as product of Example 1
Translucency index—0.54
Germicidal activity—62.9%
Dentin abrasion—Greater than about 15 units

EXAMPLE 5

Ingredients: Percent
- Silica Xerogel V — 12.00
- Silica Aerogel I — 5.00
- Sodium carragheenate — 1.10
- Saccharin — 0.20
- Glycerin — 32.69
- Water — 38.90
- Astringent salt — 0.50
- Sodium fluoride — 0.21
- Colorant (1% solution) — 1.40
- Flavor — 1.00
- 21% sodium lauryl sulfate–79% glycerin mixture — 7.00

Total — 100.00

Luster increase—62
Enamel abrasion—4 microns
Surface effects—Acceptable
Cleansing—Same as product of Example 1
Available fluoride—86%
Translucency index—0.62
Dentin abrasion—Greater than about 15 units The following comparative Examples 6, 6A and 6B illustrate the criticality of using the abrasive silica of the invention as the polishing and cleansing ingredient in the dentifrice compositions rather than using other types of silica or other polishing and cleansing ingredients.

EXAMPLE 6

This example differs primarily from Example 2 in that the abrasive silica (Xerogel V) has been replaced by dicalcium phosphate dihydrate, a common dentifrice cleansing ingredient.

Ingredients: Percent
- Dicalcium phosphate dihydrate — 15.00
- Silica Aerogel I — 8.00
- Sodium carragheenate — 1.30
- Saccharin — 0.20
- Glycerin — 31.53
- Water — 32.56
- Polyethylene glycol (average molecular weight 400) — 4.00
- Germicide — 0.10
- 21% sodium lauryl sulfate–79% glycerin mixture — 6.00
- Stannous fluoride — 0.41
- Flavor — 0.90

Total — 100.00

Luster increase—Low, 33
Enamel abrasion—2 microns
Surface effects—Acceptable
Cleansing—Significantly poorer than Pepsodent or product in Example 1
Available fluoride—25%
Translucency index—0.46

This example demonstrates that the use of a conventional cleansing ingredient results in a significant decrease in luster, cleansing ability, fluoride availability and translucency.

EXAMPLE 6A

In this example, a test was conducted to determine whether a pyrogenic silica (Cabosil) could fulfill the function of the abrasive silica of the invention. Because of the swelling properties of the Cabosil, a significantly smaller amount of this silica must be used if one is to obtain acceptable toothpaste consistencies.

Ingredients: Percent
- Silica (Cabosil) — 6.70
- Sodium carragheenate — 1.00
- Saccharin — 0.20
- Glycerin — 40.20
- Water — 40.49
- Polyethylene glycol (average molecular weight 400) — 4.00
- Stannous fluoride — 0.41
- Flavor — 0.90
- Hexachlorophene — 0.05
- Tribromosalicylanilide — 0.05
- 21% sodium lauryl sulfate–79% glycerin mixture — 6.00

Total — 100.00

Luster increase—60
Enamel abrasion—1 micron
Cleansing—None, same as water brushing
Available fluoride—85%
Translucency index—0.68

This example indicates that the use of Cabosil silica results in a dentifrice with no cleansing ability.

EXAMPLE 6B

Ingredients: Percent
- Silica Aerogel I — 15.00
- Sodium carboxymethylcellulose — 0.15
- Saccharin — 0.20
- Sorbitol (70%) — 75.14
- Sodium benzoate — 0.08
- Colorant (about 1% solution) — 0.53
- Flavor — 1.15
- Chloroform — 0.75
- 21% sodium lauryl sulfate–79% glycerin mixture — 7.00

Total — 100.00

Luster increase—54
Enamel abrasion—3 microns
Cleansing—None, same as water brushing
Translucency—0.92
Dentin abrasion—5.1 units This example demonstrates that the silica Aerogel I does not impart adequate cleansing ability to a dentifrice.

The following example illustrates the formulation of a transparent dentifrice.

EXAMPLE 7

| Ingredients: | Percent |
|---|---|
| Silica Xerogel V | 14.00 |
| Silica Aerogel I | 7.50 |
| Sodium Carboxymethylcellulose | 0.60 |
| Saccharin | 0.20 |
| Sorbitol solution (70%) | 67.82 |
| Dye solution (red) | 0.47 |
| Flavor | 2.00 |
| 21% sodium lauryl sulfate–79% glycerin mixture | 7.00 |
| Germicide | 0.10 |
| Sodium hydroxide (30% solution) | 0.31 |
| Total | 100.00 |

Translucency index—0.82
Dentin abrasion—Greater than about 15 units
Cleansing—Similar to Example 1

The following example illustrates the formulation of an opaque dentifrice having strong anti-calculus properties.

EXAMPLE 8

| Ingredients: | Percent |
|---|---|
| Silica Xerogel V | 15.00 |
| Silica Aerogel I | 8.00 |
| Sodium Carragheenate | 0.84 |
| Titanium Dioxide | 0.50 |
| Saccharin | 0.20 |
| Glycerin | 33.00 |
| Polyethylene glycol (average molecular weight 400) | 4.00 |
| FDC Blue No. 1 (1% solution) | 0.02 |
| Flavor | 1.30 |
| Hydrochloric Acid (6 N) | 0.05 |
| 21% sodium lauryl sulfate–79% glycerin mixture | 7.00 |
| Distilled water | 30.09 |
| Total | 100.00 |

Luster increase—52
Enamel abrasion—3 microns
Translucency index—Less than 0.5
Dentin abrasion—Greater than about 15 units The following example illustrates the formulation of a dentifrice wherein the silica (Xerogel V) serves as the sole polishing and cleansing ingredient. This dentifrice also contained an alpha-olefin polymer, namely, polyethylene, which serves as an organoleptic agent providing body and proper mouth feel to the dentifrice.

EXAMPLE 9

| Ingredients: | Percent |
|---|---|
| Silicia Xerogel V | 12.00 |
| High density polyethylene powder | 20.00 |
| Titanium dioxide | 0.20 |
| Hydroxyethylcellulose | 0.80 |
| Saccharin | 0.30 |
| Glycerin | 31.96 |
| Water | 22.41 |
| Polyethylene glycol (average molecular weight 400) | 5.00 |
| Flavor | 1.30 |
| 21% sodium lauryl sulfate–79% glycerin mixture | 6.00 |
| FDC Blue No. 1 (1% solution) | 0.03 |
| Total | 100.00 |

The following Examples 10–17 further illustrate the formulation of transparent dentifrices using a variety of one or more of the abrasive silicas of the invention:

EXAMPLE 10

| Ingredients: | Percent |
|---|---|
| Silicia Xerogel III | 20.00 |
| Sodium carboxymethylcellulose | 0.25 |
| Saccharin | 0.20 |
| Sorbitol (70%) | 70.04 |
| Sodium benzoate | 0.08 |
| Colorant (about 1% solution) | 0.53 |
| Flavor | 1.15 |
| Chloroform | 0.75 |
| 21% sodium lauryl sulfate–79% glycerin mixture | 7.00 |
| Total | 100.00 |

Luster increase—58
Enamel abrasion—2 microns
Cleansing—Similar to product of Example 1
Dentin abrasion—18.4 units
Translucency index—0.89

EXAMPLE 11

| Ingredients: | Percent |
|---|---|
| Silica Xerogel IV | 20.00 |
| Sodium carboxymethylcellulose | 0.30 |
| Saccharin | 0.20 |
| Sorbital (70%) | 69.99 |
| Sodium benzoate | 0.08 |
| Colorant (about 1% solution) | 0.53 |
| Flavor | 1.15 |
| Chloroform | 0.75 |
| 21% sodium lauryl sulfate–79% glycerin mixture | 7.00 |
| Total | 100.00 |

Luster increase—59
Enamel abrasion—3 microns
Cleansing—Similar to product of Example 1
Translucency index—0.92
Dentin abrasion—23.5 units

EXAMPLE 12

| Ingredients: | Percent |
|---|---|
| Silica Xerogel VI | 25.00 |
| Sodium carboxymethylcellulose | 0.60 |
| Saccharin | 0.20 |
| Sorbital (70%) | 64.62 |
| Sodium benzoate | 0.08 |
| Colorant (about 1% solution) | 0.53 |
| Flavor | 1.15 |
| Chloroform | 0.75 |
| 21% sodium lauryl sulfate–79% glycerin mixture | 7.00 |
| Sodium hydroxide | 0.07 |
| Total | 100.00 |

Luster increase—54
Enamel abrasion—6 microns
Cleansing—Appreciably better than product of Example 1
Translucency index—0.84
Dentin abrasion—136.5 units

EXAMPLE 13

| Ingredients: | Percent |
|---|---|
| Silica Xerogel V | 5.00 |
| Sodium carboxymethylcellulose | 0.60 |
| Saccharin | 0.20 |
| Sorbital (70%) | 64.62 |
| Sodium benzoate | 0.08 |
| Colorant (about 1% solution) | 0.53 |
| Flavor | 1.15 |
| Chloroform | 0.75 |
| 21% sodium lauryl sulfate–79% glycerin mixture | 7.00 |
| Sodium hydroxide | 0.07 |
| Total | 100.00 |

Luster increase—52
Enamel abrasion—7 microns
Cleansing—Appreciably better than product of Example 1
Translucency index—0.89
Dentin abrasion—155.4 units

EXAMPLE 14

| Ingredients: | Percent |
| --- | --- |
| Silica Xerogel V | 5.00 |
| Silica Xerogel III | 15.00 |
| Sodium carboxymethylcellulose | 0.60 |
| Saccharin | 0.20 |
| Sorbital (70%) | 69.69 |
| Sodium benzoate | 0.08 |
| Colorant (about 1% solution) | 0.53 |
| 21% sodium lauryl sulfate–79% glycerin mixture | 7.00 |
| Flavor | 1.15 |
| Chloroform | 0.75 |
| Total | 100.00 |

Luster increase—57
Enamel abrasion—5 microns
Cleansing—Better than product of Example 1
Translucency index—0.92
Dentin abrasion—56.3 units

EXAMPLE 15

| Ingredients: | Percent |
| --- | --- |
| Silica Xerogel VI | 10.00 |
| Silica Xerogel III | 10.00 |
| Sodium carboxymethylcellulose | 0.60 |
| Saccharin | 0.20 |
| Sorbitol (70%) | 69.69 |
| Sodium benzoate | 0.08 |
| Colorant (about 1% solution) | 0.53 |
| Flavor | 1.15 |
| Chloroform | 0.75 |
| 21% sodium lauryl sulfate–79% glycerin mixture | 7.00 |
| Total | 100.00 |

Luster increase—58
Enamel abrasion—4 microns
Cleansing—Same as product of Example 1
Translucency index—0.85
Dentin abrasion—81.9 units

EXAMPLE 16

| Ingredients: | Percent |
| --- | --- |
| Silica Aerogel I | 7.50 |
| Silica Xerogel VI | 14.00 |
| Sodium carboxymethylcellulose | 0.60 |
| Saccharin | 0.20 |
| Sorbital (70%) | 68.19 |
| Sodium benzoate | 0.08 |
| Colorant (about 1% solution) | 0.53 |
| Flavor | 1.15 |
| Chloroform | 0.75 |
| 21% sodium lauryl sulfate–79% glycerin mixture | 7.00 |
| Total | 100.00 |

Luster increase—56
Enamel abrasion—7 microns
Cleansing—Similar to product of Example 1
Translucency index—0.88
Dentin abrasion—82.2 units

EXAMPLE 17

| Ingredients: | Percent |
| --- | --- |
| Silica Xerogel V | 14.00 |
| Silica Aerogel I | 7.50 |
| Sodium carboxymethylcellulose | 0.60 |
| Saccharin | 0.20 |
| Sorbitol (70%) | 68.19 |
| Sodium benzoate | 0.08 |
| Colorant (about 1% solution) | 0.53 |
| Flavor | 1.15 |
| Chloroform | 0.75 |
| 21% sodium lauryl sulfate–79% glycerin mixture | 7.00 |
| Total | 100.00 |

Luster increase—51
Enamel abrasion—6 microns
Cleansing—Better than product of Example 1
Translucency index—0.94
Dentin abrasion—126.7 units

EXAMPLE 18

The composition of Example 17 wherein pyrogenic silica is substituted for the silica Aerogel I. The cleansing ability was better than Example 1.

It will be appreciated that various modifications and changes may be made in the dentifrice compositions of the invention in addition to those enumerated above by those skilled in the dentifrice art without departing from the essence of the invention, and accordingly, the invention is to be limited only within the scope of the appended claims.

What is claimed is:

1. An oral dentifrice composition providing good cleaning and polishing of the teeth having therein a cleansing and polishing ingredient consisting of a synthetic, amorphous, porous silica xerogel with an average particle diameter in the range from about 2 to about 20 microns, wherein the silica xerogel comprises from about 5% to about 50% by weight of the oral dentifrice composition.

2. The oral composition as defined by claim 1, which further contains from about 0.01% to about 2% by weight of an oral health agent selected from the group consisting of tyrothrycin, chlorophyllins, hexachlorophene, the sarcosides, astringent salts, sodium fluoride, lithium fluoride, stannous fluoride, potassium fluoride, ammonium fluoride, sodium fluostannite, stannous chlorofluoride, sodium monofluophosphate and mixtures thereof.

3. A translucent oral composition as defined by claim 1 wherein the silica xerogel has an average particle diameter in the range from about 5 to about 15 microns and is present in an amount from about 8% to about 20% by weight.

4. The transulcent oral composition as defined by claim 3 which further contains as a polishing ingredient from about 0.5% to about 15% by weight of a pyrogenic silica.

5. The translucent oral composition as defined by claim 4 which further contains an amount up to about 10% by weight of water-insoluble sodium metaphosphate.

6. The oral composition as defined by claim 1 which further contains as a polishing ingredient from about 0.5% to about 20% by weight of a silica aerogel.

7. The oral composition as defined by claim 6 which further contains an amount up to about 10% by weight of water-insoluble sodium metaphosphate.

8. The oral composition as defined by claim 6, which further contains from about 0.01% to about 2% by weight of an oral health agent selected from the group consisting of tyrothrycin, chlorophyllins, hexachlorophene, the sarcosides, astringent salts, sodium fluoride, lithium fluoride, stannous fluoride, potassium fluoride, ammonium fluoride, sodium fluostannite, stannous chlorofluoride, sodium monofluophosphate and mixture thereof.

9. A transparent dentifrice composition comprising about 14% by weight of silica xerogel having an average particle diameter of about 10 microns; about 7.5% by weight of a porous silica aerogel having an average particle diameter of about 3 microns; about 0.6% by weight of sodium carboxymethylcellulose; about 0.2% by weight of saccharin; about 47% by weight of sorbitol; about 0.5% by weight of a 1% solution of dye; about 2% by weight of a flavoring agent; about 7% by weight of a 21% sodium lauryl sulfate–79% glycerin mixture; about 0.1% by weight of a germicide; about 0.09% by weight of sodium hydroxide; and the balance substantially water, said dentifrice composition having a dentin abrasion value of at least about 15.

10. A transparent dentifrice composition comprising about 14% by weight of a silica xerogel having an average particle diameter of about 10 microns; about 7.5% by weight of a silica aerogel having an average particle diameter of about 3 microns; about 0.6% by weight of sodium carboxymethylcellulose; about 0.2% by weight of saccharin; about 47% by weight of sorbitol; about 0.08% by weight of sodium benzoate; about 0.5% by weight of a 1% solution of dye; about 1% by weight of a flavoring agent; about 0.8% by weight of chloroform; about 7% by weight of a 21% sodium lauryl sulfate–79% glycerin mixture; and the balance substantially water, said dentifrice composition having a dentin abrasion value of at least about 15.

References Cited
UNITED STATES PATENTS

| | | | |
|---|---|---|---|
| 2,059,396 | 11/1936 | Ripert | 424—49 |
| 2,222,969 | 11/1940 | Kistler | 424—57 |
| 2,994,642 | 8/1961 | Bossard | 424—49 |

RICHARD L. HUFF, Primary Examiner

U.S. Cl. X.R.

424—52, 54, 57